Dec. 25, 1962 P. MILLER 3,070,476
ORNAMENTATION OF RESILIENT ABSORBENT MATERIALS
Filed July 22, 1960 2 Sheets-Sheet 1
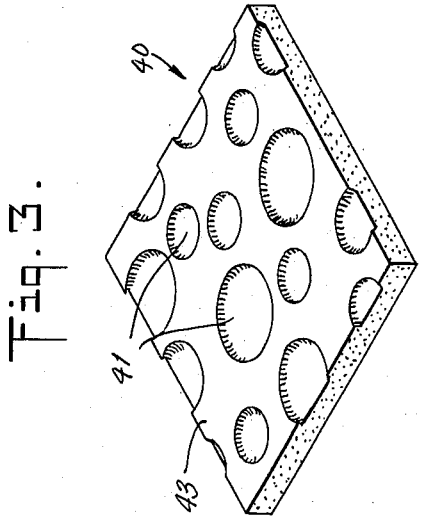
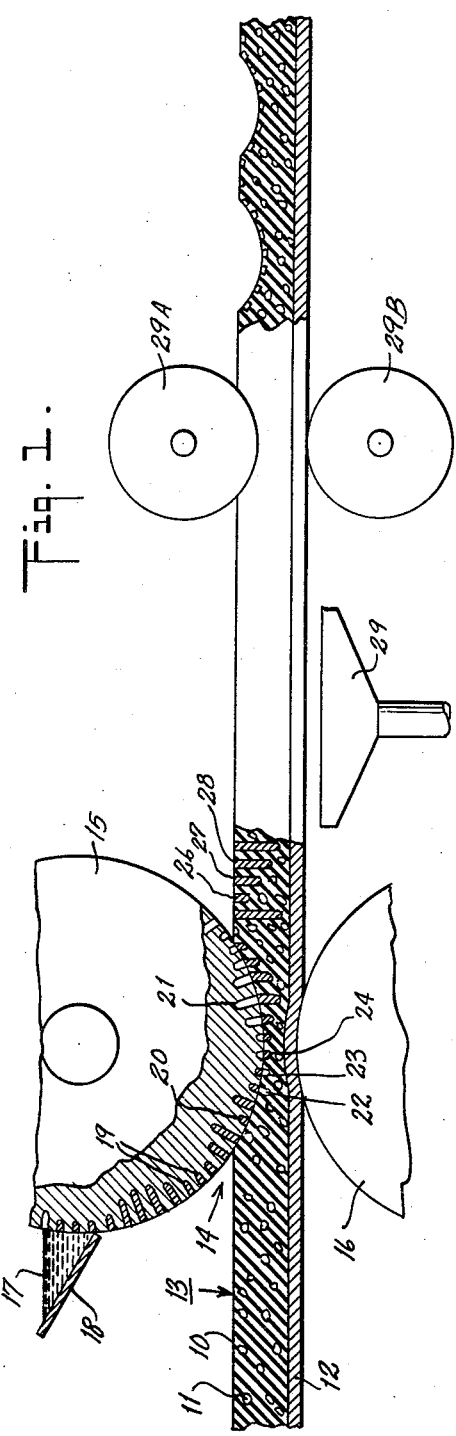
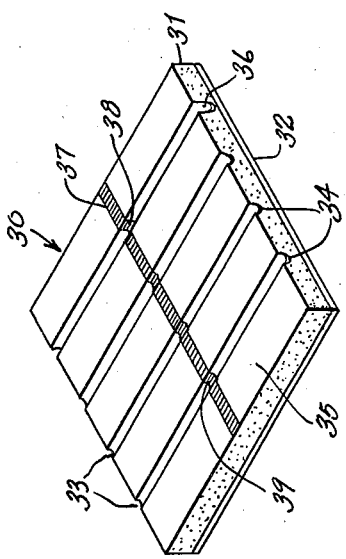
INVENTOR.
PHILIP MILLER
BY Darby & Darby
ATTORNEYS Dec. 25, 1962 P. MILLER 3,070,476
ORNAMENTATION OF RESILIENT ABSORBENT MATERIALS
Filed July 22, 1960 2 Sheets-Sheet 2
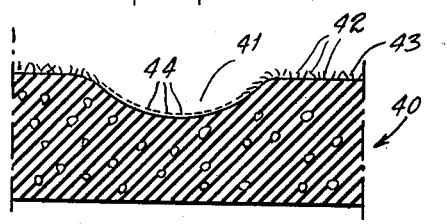
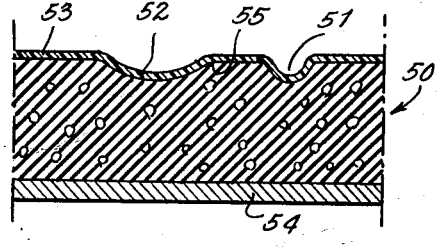
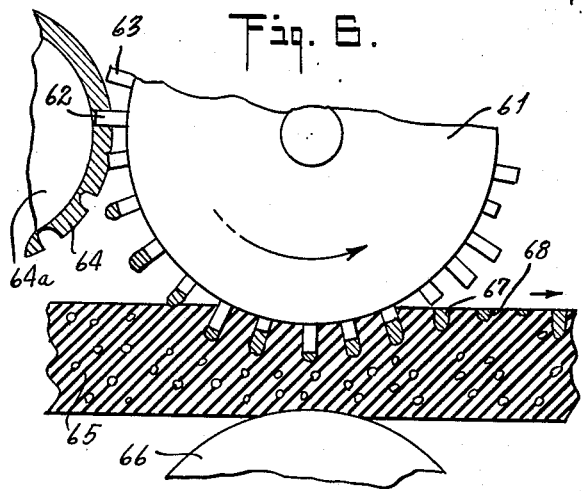
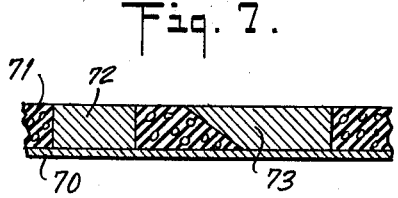
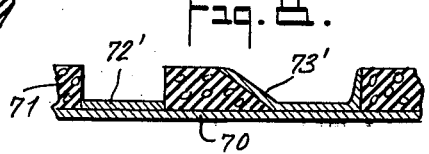
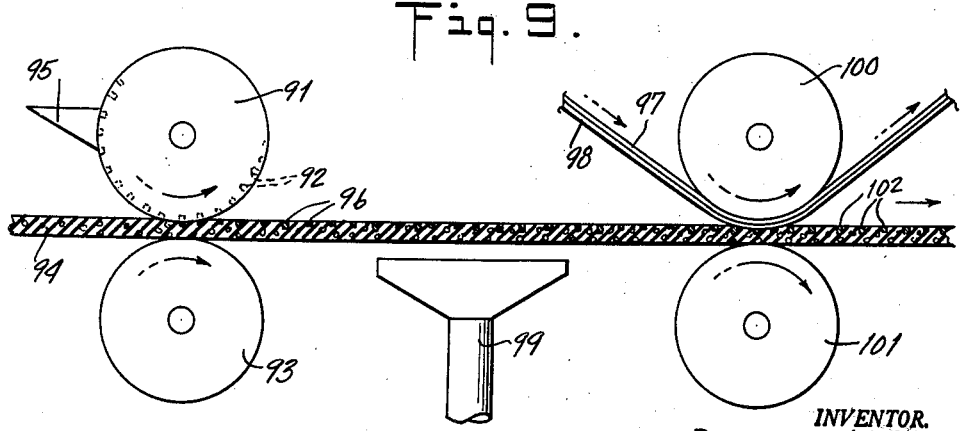
INVENTOR.
PHILIP MILLER
BY Darby & Darby
ATTORNEYS United States Patent Office 3,070,476
Patented Dec. 25, 1962

3,070,476
ORNAMENTATION OF RESILIENT ABSORBENT MATERIALS
Philip Miller, Yonkers, N.Y., assignor to Hicks & Otis Prints, Inc., Norwalk, Conn., a corporation of Connecticut
Filed July 22, 1960, Ser. No. 44,649
9 Claims. (Cl. 154—48)

This invention relates to ornamentation of resilient absorbent materials and more particularly to the production of surface ornamentation thereof.

In accordance with the invention, a wide variety of surface colorings, contours, contrasts, and combinations of the same may be produced. Perfect accuracy of registry between color and contour may be achieved.

The present invention is particularly useful with materials, and especially sheet materials, which are liquid-absorbent and which are resilient. The degree of resilience may vary considerably, commensurate with the objectives of the invention. Hence, a wide range of hysteresis curves for the resilient material is normally acceptable.

Among the materials which are most suitable for the practice of this invention are open-cell foam sheet materials such as polyether and polyester polyurethanes, natural rubber, synthetic rubber, and vinyl plastics. The cells are preferably interconnected initially before the ornamentation process is practiced, but it is also contemplated that closed pore or closed cell materials may be used and the walls between the cells may be broken down mechanically as by crushing, or by heating to expand the gas within the cells or by applying a solvent which penetrates or breaks down portions of the walls between the cells. Representative of the materials to which the process may be applied are foam or sponge rubber materials including foamed latex, and foamed or expanded synthetic rubber polymers and copolymers such as butadiene-styrene, butadiene-acrylonitrile, polyvinylidene, isoprene polymers and copolymers, as well as polyvinyl chlorides and polyvinyl acetates and copolymers thereof and related compositions. "Sponge sheet" as used hereinafter will mean any of the materials described as those to which this process may be applied or their equivalents.

In general, the sponge sheet is colored and contoured by depositing a colored adhesive upon selected areas on the surface of the sheet, preferably to a predetermined depth. The thickness of the sheet is then uniformly reduced and the adhesive is at least partially set while the sheet is under compression. The setting of the adhesive may occur in any desired manner as is well known in the adhesive art, e.g., by the passage of time, evaporation of solvent, in situ polymerization or copolymerization or condensation of the components, application of heat or pressure, or otherwise or by a combination of the foregoing. The sheet is then relaxed, permitting recovery of the unselected areas, contrasted with at least partially continued compression of the selected areas. Thus, there is formed in accordance with the invention an open-pored spongy sheet having selected colored surface areas where the thickness of the sheet corresponding to the selected areas differs in sectional dimension from other areas of the sheet. In normal practice, the colored areas are predominantly confined to one side of the sheet, although both sides may be treated and waffle-like contours may be obtained. In accordance with the invention the areas selected for compression and coloring may have varying thicknesses.

In accordance with this invention a sheet of spongy material having open pores comprises depressed areas and raised areas, the depressed areas being colored contrastingly to the raised areas. In the preferred embodiment each cross-section of the sheet which has a depressed surface area comprises an adhesive which holds the pores of the sponge at least under partial compression. The term "adhesive" as used herein also may include any composition, whether normally considered an adhesive or not, which has the ability to maintain deformation of the walls of the cell structure.

Various present preferred embodiments of the invention are illustrated in the accompanying drawings, in which:

FIGURE 1 is a diagrammatic elevation of apparatus for performing the present invention and illustrates a preferred method of practicing the invention;

FIGURE 2 is an isometric view of a sponge laminate embodying the invention;

FIGURE 3 is an isometric view of a spongy material embossed and imprinted in accordance with the present invention;

FIGURE 4 is a greatly enlarged fragmentary cross-section of the material shown in FIGURE 3;

FIGURE 5 is a fragmentary cross-section of another embodiment of the invention;

FIGURE 6 is a diagrammatic elevation of alternative apparatus;

FIGURE 7 is a diagrammatic cross-section of a spongy sheet into which has been deposited colored adhesive, the sheet being shown after relaxation and before final compression;

FIGURE 8 is a similar view showing a subsequent step in the process; and

FIGURE 9 is a diagrammatic elevation of apparatus for transferring metal or pigment to a sheet of spongy material.

The process may be readily understood by reference to FIGURE 1. A sheet of spongy resilient material 10, e.g. polyurethane foam, having pores 11 interconnected with each other is backed by a base sheet 12 which may conveniently be a textile fabric or any other material suitable to support the spongy material 10. The sheet 12 may be longitudinally and/or laterally extensible or inextensible, or it may be omitted. The sheet 12 is preferably air-pervious to facilitate rapid drying of the spongy material 10; although sheet 12 may, when desirable, be fluid-impervious.

The composite sheet 13 comprising base 12 and sponge 10 is passed through a nip 14 between rolls 15 and 16. Roll 15 is a gravure or engraved roll which is inked in any suitable manner as by a colored adhesive 17 applied by a doctor blade 18.

In the embodiment shown in FIGURE 1, the roll 16 is a smooth-surfaced cylinder which may be made of metal, or rubber or metal coated with rubber or otherwise suitably constructed. This back-up roll 16 may, of course, when desired for surface ornamentation, be an engraved roll similar to roll 15, with either a similar or contrasting design engraved or otherwise produced thereupon. Roll 16 may be caused to be rotated at a speed synchronized with that of roll 15.

The surface of the roll 15 contains engraved or otherwise produced recesses 19 preferably of varying depths. For example, the recess 21 is several times deeper than recess 20. Each of the recesses is inked in any suitable manner by the colored adhesive 17 which is temporarily retained in the recess by adhesive or capillary action or otherwise. As the sheet 13 is fed through the nip between the rolls, those recesses 19 and 20 which are inked are gradually brought into compressive contact with the spongy material, which beginning in the vicinity of the compressed surface at 22, commence to deposit the ink into the body of the spongy material 10 as at 23 and 24. The depth of the adhesive ink thus imprinted corresponds to the depth of the recesses from which the ink is deposited. The depth to which the deposited adhesive ink penetrates and impregnates (these terms being used interchangeably throughout the description and claims) the compressed spongy sheet 10 varies as between imprints 22, 23 and 24, but each penetrates and impregnates transversely into the thickness of the spongy sheet dependent upon the volume of adhesive ink applied at the proper viscosity.

It will be noted that at the inked impressions 26, 27 and 28, the imprints are all relative straight lines traversing the thickness of the spongy material. One of the advantages of the present invention, especially when printing spongy material, is that the process tends to lessen lateral migration of the ink, thereby producing relatively sharp-edged, well defined color contrasts. Apparently the relaxation of the spongy sheet 10, after it leaves the printing nip has the effect of confining the ink to transverse paths and minimizes further flow of the ink in a direction other than transverse.

After the adhesive ink is deposited, the adhesive is rendered at least partially settable by any suitable means. For example, if the adhesive is in a volatile carrier or solvent, passing the sponge web over a heater 29 to remove at least part of the solvent, renders the adhesive settable and hence the product is ready for the next step. Some adhesives then become tacky.

The sheet is then fed to the pressure device, for example, a pair of squeeze rolls 29A and 29B having a nip therebetween of predetermined dimension less than the normal thickness of the sponge web. This second compression of the sheet, after the adhesive ink has been rendered settable, reduces the thickness of the sheet at the nip. In the areas of the sponge web to which the adhesive ink has been applied, the selected inked portions of the sheet remain compressed and the unselected areas of the sheet expand by virtue of the resilience of the sheet, back to their original thickness. Thus, there is produced on the sheet a selected contour corresponding precisely to the color applied to the selected areas. To prevent the inked areas of the sheet from adhering to the squeeze roll 29A in contact therewith, it has surprisingly been found sufficient to cool that roll, preferably below 70° F., for the usual adhesives.

A typical effect produced by the present process may be seen in FIGURE 2, wherein the sheet 30 having spongy layer 31 on a backing 32 has parallel depressions 33 colored as indicated by the heavy lines at 34 where the compressed ink has been impregnated and retained after the adhesive was fixed or set. These depressed colored areas contrast with the normal surface area 35.

Depression 36 occurs where a deeper deposit of colored ink was applied, as described previously in connection with FIGURE 1. Varied and more complicated patterns may be achieved, as for example by pre-printing with non-adhesive ink the unprinted surface of the spongy material 31 with a contrasting colored stripe 37 before the present invention is applied. This stripe is unaffected in the flat unselected portions of the area at 35 but is incorporated into the depressed areas as at 38 and 39. When the ink at 34 is opaque, the stripe at 38 and 39 will be virtually obliterated, but when the adhesive ink is otherwise colored, a pre-selected combination of colors for the ink at 34 and for the stripe at 37 will give a pleasing design and can be used for plaid-like configurations. Of course after the invention is practiced, other subsequent printing operations may be performed as desired, yielding a multiplicity of pattern combinations. Patterns of any desired complexity may also be produced by providing further rolls corresponding to rolls 15 and 16 for imparting different colors.

FIGURE 3 shows a spongy sheet 40 which has been imprinted by an engraved roll with random disconnected areas 41 of a crater-like contour. The craters 41 represent compressed depressions which can be seen individually in detail in FIGURE 4. The entire upper surface of the sheet 40 is coated with a coloring composition comprising minute metallic flakes 42 which on the uncompressed non-selected areas 43 of the material lie indiscriminately in various planes. In the compressed areas the metallic flakes 44 lie in relatively planar position with respect to each other and generally parallel to the over-all upper surface of the material. Thus, where the compression has been applied to and retained to form the crater 41, a surface which is shiny and relatively highly light-reflective is produced, as contrasted to the uncompressed areas 43 which are still metallic but relatively dull.

FIGURE 5 shows an embossed spongy sheet in which the sponge layer 50 has depressions 51 and 52 formed in suitable manner such as described above. A superposed sheet of surface coating material 53 may comprise textile fabric, sheet plastic such as polyethylene, vinyl sheeting, or other similar laminar material. The base 54 may be attached or applied before or after the contouring operation or may be omitted. This sheet 50 is made by first applying adhesive in the manner described above, but the adhesive does not in this instance require a color component unless the layer 53 is translucent. The layers 50, 53 and 54 may be adhered together in the previously described manner as by any suitable adhesive. Thus a contoured material body is produced having an upper added layer conforming to the contour, which conformation may be ensured by a thin adhesive layer at the inner surface 55.

As shown in FIGURE 6, the printing roll 61 may have long projections 62 and short projections 63 to pick up ink adhesive 64 from a rubber inking roller 64a. As the sponge rubber sheet 65 passes between the nip between rollers 61 and 66, the ink is deposited at 67, 68 etc.

Longer projections 62 would pick up less ink while shorter projections 63 would pick up a greater amount, thereby achieving substantially the result achieved by the apparatus of FIG. 1. Various types of printing rollers may be used to deposit the ink.

FIGURE 7 shows a cross-section of a web 70 supporting a spongy material 71 having one colored area 72 produced all the way through the spongy material and another wedge-shaped section 73 of colored adhesive applied at another selected area and cross-section. This fabric after deposit, as shown in FIGURE 7, is heated, the adhesive rendered tacky, and then is passed through a cold nip. After relaxation, the material shown in FIGURE 8 is produced. Here the spongy layer 71 attached to the web 70 has a compressed color area 72' corresponding to printed area 72 and another slanted area 73' colored and contoured corresponding generally to printed area 73.

FIGURE 9 illustrates apparatus for producing metallic colored embossed spongy resilient material. A roller 91 provided with a printing surface 92 forms a nip with roller 93 to receive the spongy material 94. Adhesive is applied to the printing surface from reservoir 95 and the material is imprinted with adhesive as shown at the selected locations 96. A layer of backing material 97 carries a thin layer of vacuum metalized transfer color 98 (e.g. that known as roll leaf die stamping film or stamping leaf) which can be held loosely on the plastic backing and subsequently held by the adhesive and released from the film in selected areas. After the sheet 94 has passed heater 99 it is fed into the nip between squeezed rolls 100 and 101 together with the metallic layer on the backing. The metallic layer being fragile and easily torn is thus transferred to the adhesive only at selected portions 102 on the sheet. The indentations in the sheet at 102 may be thus formed simultaneously with the application of the decorative metalized composition of gold or other metal.

The product of the present invention is useful not only as decorative material but may be utilized as heat and sound insulators, for example, in airplane cabins, automobile bodies, walls of rooms, box linings, and in other applications where decoration or insulation or both are desired. In auto body headliners, the flexibility and resilience of the invention greatly facilitate installation by unskilled labor. Fire-retardent or other coatings may be applied to the outer surface of the decorating materials, either before or after printing, embossing and processing, so long as such application does not harm the final characteristics sought in the ultimate product.

Various printing compositions may be used in which dyes, inks, pigments, lacquers, and other suitable coloring compositions may impart the desired tint or hue. The adhesive may be rubber cement, rubber latex, synthetic rubber cement, cellulose cement, heat-sensitive adhesives, pressure-sensitive adhesives, and thermosetting compounds. Particularly advantageous results have been obtained using epoxy resins, with various catalysts well known in the adhesive art.

Any material may be used having adhesive properties and which can be injected by the printing process into the body of the spongy material. The adhesive may be applied by a continuous process such as described above, or may be done on a flat plate process, such as silk screenings, followed by a flat plate or press squeezing process to impart the necessary ultimate contour of the material.

If desired, the process may be practiced by first printing the total or partial surface with the adhesive, then overprinting with a solvent (inked or clear) to relax the compressed portion.

While the invention may obviously be practiced with a wide variety of materials as indicated herein, the following examples are preferred embodiments which have been used with success. In each instance the parts are by weight unless otherwise stated.

Example 1

The adhesive formulation may be in the following range:

Acrylonitrile rubber (butadiene acrylonitrile copolymer), 10–40%.
Vinyl chloride-vinyl acetate resin, 45–15% (generally used in decreasing amounts with increasing amounts of acrylonitrile rubber).
Toluol, 20–60%.
Methylethyl ketone, 10–40%.

Almost any die or pigment may be used to impart the desired color to the adhesive. Viscosities may range 100 cps. to 5000 cps. depending upon the depth of engraving, speeds of operation, and drying times desired. The amounts of rubber and vinyl resin may vary and either may be omitted if desired. The solvents may also be varied, depending upon the consistency and requirements of the adhesive.

Example 2

| | Parts |
|---|---|
| Polyester solution (Du Pont #46951), 20% solids | 25 |
| Isocyanate solution (Du Pont #RC–807), 60% solids | 7 |

The above resins are mixed and color added, either dyes or pigments. The viscosity can be adjusted by adding either dioxane, methyl ethyl ketone, or tetrahydrofuran so that a good printing viscosity is achieved, namely, 150 to 300 cps.

Example 3

| | Parts |
|---|---|
| Epoxy resin (Shell Chemical Co. #1003), parts solids, in a 70% solution | 60 |
| Polyamide cure (General Mills Corp. #125), parts solids in a 70% solution | 40 |
| Pigment, e.g. TiO$_2$ solids | 100 |
| Total solids | 200 |

Example 4

| | Percent |
|---|---|
| Acrylic ester resin (Rohm & Haas B72) | 30 |
| Toluol (solvent) | 70 |

Mixtures of vinyl resins and acrylic resins may be used with appropriate solvents in the adhesive formulations.

While certain present preferred embodiments of the invention have been shown and described, it is to be understood that the invention may be otherwise embodied and practiced within the spirit of this disclosure and within the scope of the appended claims.

What is claimed is:

1. The process of decorating and contouring a normally resilient open-pored sponge sheet which comprises coating as adhesive onto selected areas of the surface of said sheet, at a time when said adhesive is settable reducing the thickness of at least portions of the sheet, said portions including both said selected areas and other areas, at least partially setting said adhesive while said sheet is in compression, and relaxing the compression on said sheet.

2. The process of decorating and contouring a normally resilient open-pored sponge sheet which comprises coating an adhesive onto selected areas of the surface of said sheet, adhering a layer of fabric on said surface, at a time when said adhesive is settable reducing the thickness of at least portions of the sheet, said portions including both said selected areas and other areas, at least partially setting said adhesive while said sheet is in compression, and relaxing the compression on said sheet.

3. The process of decorating and contouring a normally resilient open-pored sponge sheet which comprises coating an adhesive onto selected areas of the surface of said sheet, pressing a fragile metallic layer supported by a backing layer against said sheet, at a time when said adhesive is settable reducing the thickness of at least portions of the sheet, said portions including both said selected areas and other areas, at least partially setting said adhesive while said sheet is in compression, relaxing the compression on said sheet, and removing said backing layer to cause said metallic layer to be applied to said sheet only at the adhesive-coated portions thereof.

4. The process of decorating and contouring a normally resilient open-pored sponge sheet which comprises coating an adhesive onto selected areas of the surface of said sheet, at a time when said adhesive is settable reducing the thickness of at least portions of the sheet by passing the sheet between two rollers, the roller contacting said adhesive coated surface of said sheet being at a temperature below 70° F., said portions including both said selected areas and other areas, at least partially setting said adhesive while said sheet is in compression, and relaxing the compression on said sheet.

5. An embossed sheet material comprising a sheet of normally open-pored resilient sponge material having a surface including relatively depressed areas, said sheet being of reduced thickness in said areas, the surface portions of said reduced thickness portions being coated with an adhesive material, said normally open-pored resilient sponge material in said reduced thickness portions having compressed cell structure maintained in said compressed state by said adhesive material, at least part of the undepressed areas of said sheet material being free of said adhesive material.

6. An embossed sheet material comprising a sheet of normally open-pored resilient sponge material having a surface including relatively depressed areas, said sheet being of reduced thickness in said areas, the surface portions of said reduced thickness portions being coated with an adhesive material, said normally open-pored resilient sponge material in said reduced thickness portions having compressed cell structure maintained in said compressed state by said adhesive material, at least part of the undepressed areas of said sheet material being free of said adhesive material, and a layer of laminar material thinner than said sheet adhered thereto and coextensive therewith.

7. An embossed sheet material comprising a sheet of normally open-pored resilient sponge material having a surface including relatively depressed areas, said sheet being of reduced thickness in said areas, the surface portions of said reduced thickness portions being coated with an adhesive material, said normally open-pored resilient sponge material in said reduced thickness portions having compressed cell structure maintained in said compressed state by said adhesive material, at least part of the undepressed areas of said sheet material being free of said adhesive material, and a layer of textile fabric adhered to said surface and substantially conforming to the contours thereof.

8. An embossed sheet material comprising a sheet of normally open-pored resilient foamed sponge material having a surface including relatively depressed areas, said sheet being of reduced thickness in said areas and having different thicknesses in respective areas, the surface portions of said reduced thickness portions being coated with a colored adhesive material having a color contrasting with that of said sheet, said normally open-pored resilient sponge material in said reduced thickness portions having compressed cell structure maintained in said compressed state by said colored adhesive material, at least part of the undepressed areas of said sheet material being free of said adhesive material.

9. An embossed sheet material comprising a sheet of normally open-pored resilient sponge material having a surface including relatively depressed areas, said sheet being of reduced thickness in said areas, the surface portions of said reduced thickness portions being coated with an adhesive material, said normally open-pored resilient sponge material in said reduced thickness portions having compressed cell structure maintained in said compressed state by said adhesive material, at least part of the undepressed areas of said sheet material being free of said adhesive material and a metallic layer on the adhesive-coated portions of said sheet held to said sheet by said adhesive material.

References Cited in the file of this patent
UNITED STATES PATENTS

| | | |
|---|---|---|
| 227,115 | Lawrence | May 4, 1880 |
| 1,728,397 | Dearden | Sept. 17, 1929 |
| 2,362,884 | Clark | Nov. 14, 1944 |
| 2,666,954 | Potter | Jan. 26, 1954 |
| 2,838,416 | Babiarz et al. | June 10, 1958 |
| 2,943,949 | Petry | July 5, 1960 |
| 2,954,838 | Nuorivaara | Oct. 4, 1960 |
| 2,961,332 | Nairn | Nov. 22, 1960 |
| 3,009,440 | Kent | Nov. 21, 1961 |

UNITED STATES PATENT OFFICE
CERTIFICATE OF CORRECTION

Patent No. 3,070,476                 December 25, 1962

Philip Miller

It is hereby certified that error appears in the above numbered patent requiring correction and that the said Letters Patent should read as corrected below.

Column 5, line 58, for "Polyster" read -- Polyester --; line 59, for "#RC-807" read -- #RC-805 --; column 6, line 15, for "as" read -- an --.

Signed and sealed this 8th day of October 1963.

(SEAL)
Attest:

ERNEST W. SWIDER
Attesting Officer

EDWIN L. REYNOLDS
Acting Commissioner of Patents